United States Patent [19]
Marsh et al.

[11] 3,753,538
[45] Aug. 21, 1973

[54] VEHICLE COMMAND SYSTEMS

[75] Inventors: Michael Martin Marsh, Biggleswade; Geoffrey Thompson, Letchworth; Brian Thomas Trayner, Hitchin, all of England

[73] Assignee: British Aircraft Corporation Limited, London, England

[22] Filed: May 12, 1971

[21] Appl. No.: 143,714

[30] Foreign Application Priority Data
May 18, 1970  Great Britain.................. 24,018/40

[52] U.S. Cl.............................. 244/3.12, 244/3.16
[51] Int. Cl.......... F41g 7/02, F41g 7/10, F41g 9/00
[58] Field of Search........................... 244/3.16, 3.12

[56] References Cited
UNITED STATES PATENTS
2,873,381   2/1959   Lauroesch ........................ 244/3.16
2,884,540   4/1959   Shockley.......................... 244/3.16
3,544,217   12/1970  McEntyre ......................... 244/3.16

Primary Examiner—Benjamin A. Borchelt
Assistant Examiner—Thomas H. Webb
Attorney—Cushman, Darby & Cushman

[57] ABSTRACT

A command-to-line-of-sight system for controlling guided missiles from an aircraft, in which a two-axis free gyroscope is mounted in the controlling aircraft and maintained as an analogue of a directional reference gyroscope carried in the missile, the analogue gyroscope being mounted in a free gimbal system whose outer free gimbal is pivotally supported by a pair of controlled gimbals. The controlled gimbals are driven by servo mechanisms in response to position signals derived from an optical sight in the controlling aircraft so that the roll axis of the analogue gyroscope is maintained approximately parallel to the line of sight. A compensating signal derived from the analogue gyroscope and representative of roll of the controlling aircraft is supplied to the command signal transmitter in the controlling aircraft and is employed to correct the transmitted command signals so as to compensate for misalignment between the attitude axes of the controlling aircraft and the axes of the missile directional reference system. Alternatively the signal derived from the analogue gyroscope may be employed to maintain the optical image produced by the sight in a fixed attitutde relatively to the aircraft despite roll of the aircraft.

9 Claims, 10 Drawing Figures

Patented Aug. 21, 1973

INVENTORS
MICHAEL M. MARSH
GEOFFREY THOMPSON
BRIAN T. TRAYNER

Patented Aug. 21, 1973

INVENTORS
MICHAEL M MARSH
GEOFFREY THOMPSON
BRIAN T. TRAYNER

FIG. 6.

Patented Aug. 21, 1973

INVENTORS
MICHAEL M. MARSH
GEOFFREY THOMPSON
BRIAN T. TRAYNER

VEHICLE COMMAND SYSTEMS

This invention relates to vehicle command systems in which a first vehicle moving in space is commanded to a line of sight by means of a sighting and guidance system mounted in a second moving vehicle from which the first vehicle is controlled. The invention is particularly although not exclusively applicable to a command to line-of-sight system for controlling a guided missile from a helicopter or ship.

In such systems, the axes of the attitude reference system in the first vehicle, referred to as the missile, may become misaligned with the axes of the guidance system which is mounted in the controlling vehicle, due for example to movement of the controlling vehicle, with the result that control signals transmitted to the missile are in error and the accuracy of guidance of the missile is degraded.

The object of the present invention is to eliminate or reduce such error by compensating for the movement of the controlling vehicle.

According to the present invention, in a vehicle command system which comprises a movable controlling vehicle, a controlled vehicle, referred to as a missile, and means for launching the missile into flight from the controlling vehicle and for controlling the flight of the missile by transmitting command signals from a transmitter in the controlling vehicle to cause the missile to fly along a given line of sight from the controlling vehicle, the missile having a flight control system responsive to the said command signals and including an attitude reference system, an analogue of the missile attitude reference system is mounted in the controlling vehicle and is maintained with the axes of its directional components at the same attitudes in space as the axes of the corresponding components of the missile attitude reference system both before and after the instant of launch of the missile and during its flight, and means is provided for correcting the command signals transmitted from the transmitter by reference to the analoque reference system in the controlling vehicle in such a way as to compensate for changes in the attitude of the controlling vehicle relative to the missile attitude reference system after the launching of the missile.

The analogue reference system may comprise a two axis free gyroscope whose rotor is mounted in inner and outer free gimbals, the outer free gimbal being pivotally supported in a further gimbal system comprising inner and outer controlled gimbals, servo means being provided for maintaining the controlled gimbals in attitudes in which they support the free gyroscope with its outer gimbal pivotal axis in a predetermined directional relationship with, and approximately parallel to, the said given sight line.

The analogue reference system may include means for deriving a signal which represents the angular displacement of the inner controlled gimbal relatively to the outer free gimbal of the free gyroscope about the pivotal axis of the latter, and means may be provided for utilizing the said signal for correcting the command signal to compensate for changes in attitude of the controlling vehicle.

An optical sighting system may be mounted in the controlling vehicle and a manually operated joystick control may be provided for the command signal transmitter, the sighting system including means for generating output signals representing its angular displacement in elevation and azimuth from the attitude reference axes of the controlling vehicle, and the output signals from the sighting system being fed into the servo means so as to cause corresponding angular displacements of the control gimbals.

In an arrangement in which the optical sighting system provides a visual image which shows the missile in flight and the lateral displacement of the missile from the sight line, the signal representing relative pivotal displacement of the inner controlled gimbal may be employed to compensate the command signals for errors caused by the apparent tilting of the image as seen in the sight relatively to the controlling vehicle due to tilting of the controlling vehicle.

Alternatively, the signal representing angular displacement may be employed to rotate the image optically, for example by means of a rotary prism device, so as to compensate for tilting of the controlling vehicle and to maintain the image erect relative to the controlling vehicle and as viewed by an operator therein.

The invention in another form comprises a command system mounted in a controlling vehicle for controlling a missile carrying an attitude reference system, the command system including in combination a transmitter device for supplying command signals to control the flight of the missile, a mechanical analogue of the missile attitude reference system supported in an inner and outer controlled gimbal arrangement mounted in the control vehicle, an electrical pick-off and motor mounted in each of the pivotal axes of support of the inner and outer controlled gimbals, a sighting apparatus mounted in the control vehicle for rotation about first and second axes respectively corresponding to the axes of pivotal support of the inner and outer controlled gimbals, electrical pick-offs mounted in each of the first and second axes of the sighting apparatus for supplying position signals representative of the rotational movements of the sighting apparatus, electrical servo devices with position feed-back connecting the pick-offs associated with the axes of the sighting apparatus to the pick-offs and motors in the inner and outer controlled gimbals, means for activating the analogue reference system and coupling the analogue to the sighting system through the servo devices simultaneously as the missile reference system is activated by means of a signal used to launch the missile, and a device for correcting the command signals to the missile in a manner determined by an output signal from the analogue reference system to compensate for movement of the control vehicle.

The invention may be carried into practice in various ways, but two specific embodiments will now be described by way of example only, with reference to the accompanying drawings in which:

In the embodiment of the invention shown in FIGS. 1 to 4 a command-to-line-of-sight system is provided for controlling a guided missile 10 launched from a helicopter 11. An optical sighting system 12 is mounted in the helicopter 11 on a two-gimbal mount 13, being shown in this case as a simple telescopic sight 12 through which an operator 14 sitting in the helicopter can view a target 15. The telescopic sight 12 defines a line of sight 16 which the operator aims at the target 15, the missile 10 being visible in the sight as indicated at 10' in FIGS. 1A and 1B after it has been launched from the helicopter. The missile 10 is provided with a receiver and amplifier 17 by which control signals transmitted from the helicopter after launching are utilized to actuate the missile fins 18 to control the flight of the missile. The initial capture of the missile immediately after launching to bring it into the field of vision of the sight is performed automatically by capturing control means (not shown) which forms no part of the present invention. After the missile has been captured by the automatic capturing control and is directed generally along the line of sight 16 and is visible at 10' in the sight 12, the operator controls the flight of the missile onto the target 15 by means of a control unit 20 provided with a manually-operated joystick control 21. The control unit 20 transmits control signals to the missile 10 in accordance with the positioning of the joystick control 21, these control signals being transmitted for example by means of control leads 22 trailed behind the missile in flight, or by a radio link. The operator aims his optical sight 12 at the target 15 and manipulates the joystick 21 in such a way as to bring the image 10' of the flying missile as seen in the sight onto the image 15' of the target 15 as seen in the sight. These movements of the joystick control the flight of the missile 10 in such a way as to guide it onto the target 15 by directing the missile along the line of sight 16.

Figures 1, 1A, 1B:
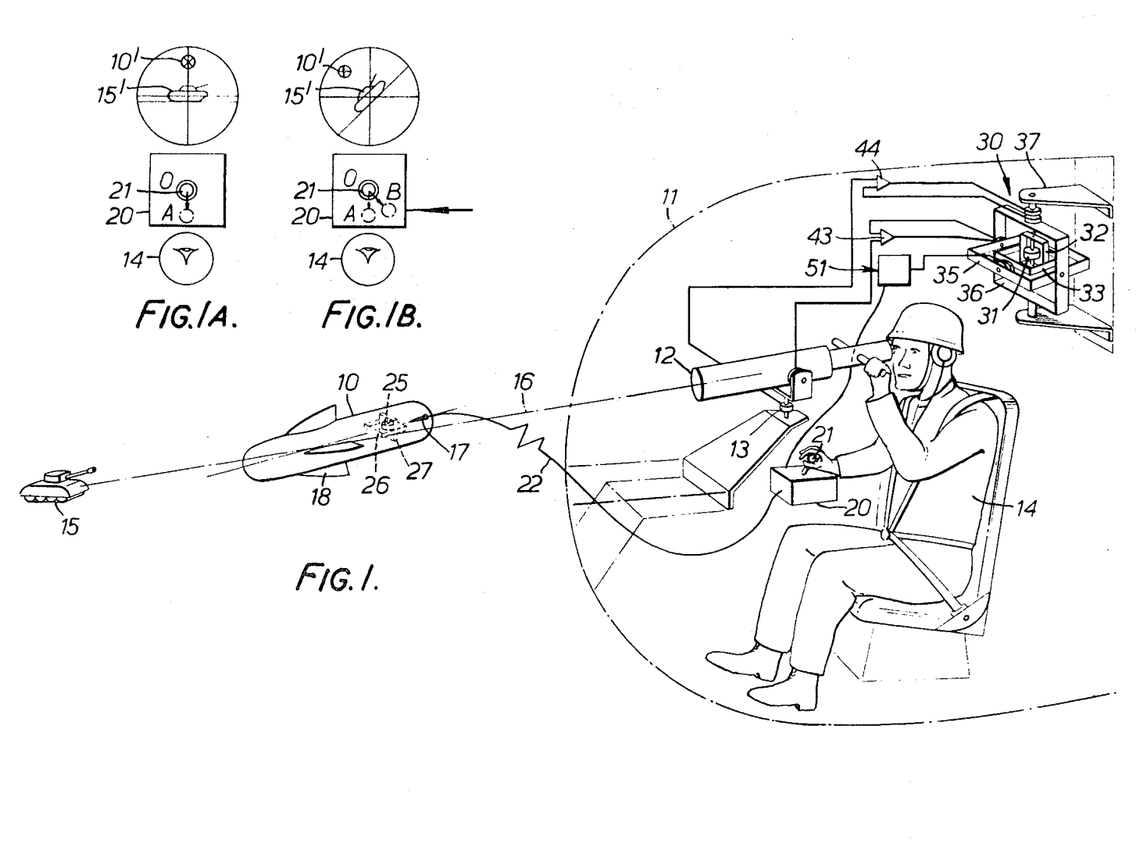
FIG. 1 is a diagram of a control system for a guided missile launched and controlled from a helicopter.
FIGS. 1A and 1B illustrate diagrammatically the picture displayed by the optical sight and the corrective movement required of the joystick control in the system of FIG. 1, respectively with the helicopter in level flight and when rolled through 45°.

The missile 10 is provided with an attitude reference system comprising a two-axis displacement gyro 25 mounted in gimbals 26, 27 and provided with electrical pick-offs which supply directional reference information to the missile receiver/amplifier 17. The control signals from the control unit 20 in the helicopter are referred to the directional axes defined by the missile reference system 25 to 27, and the resultant outputs are employed to control the missile.

It will be apparent that as long as the control helicopter remains in steady flight and maintains the same attitude throughout the entire period of flight of the missile from launch to strike, the attitude reference axes of the control system in the helicopter will remain correctly related to the attitude reference axes in the missile and the guidance signals transmitted from the control unit 20 will correctly control the missile. However the axes of the reference system 25 to 27 in the missile are liable to become misaligned with those of the control system in the helicopter, due for example to flight movements of the helicopter involving attitude changes in roll, yaw and pitch, information of which changes which will not be directly passed to the missile through the radio or wire link 22. As a result of this misalignment the control signals transmitted to the missile in response to the movements of the joystick 21 by the operator will be in error, and the accuracy of guidance of the missile will be degraded.

For example, referring to FIG. 1A, assume that the operator is aiming the sight 12 at a target 15 lying on the fore-and-aft axis of the helicopter whilst the latter is in steady level forward flight, and has launched a missile 10 which has been captured and is visible at 10' in the sight. Suppose that at a given instant the operator sees the missile image 10' above the image 15' of the target in the sight, as shown in FIG. 1A, he may then move the joystick control 21 from the centralized position O to a "six-o'clock" position A, i.e., immediately towards him, in order to transmit a correcting signal to the missile which will bring the flight line of the missile towards the line of sight 16 to the target.

However, should the helicopter roll through 45° about its fore-and-aft axis, the picture seen by the operator in the sight will also appear to roll, the horizon tilting through 45°, as indicated in FIG. 1B. To bring the missile image 10' towards the target image 15' the operator would expect to have to move the joystick control 21 not directly towards his body to position A but obliquely across his body along a path inclined at 45° and to a "half-past four" position indicated at B in FIG. 1B, the direction O-B corresponding to the direction 10'-15' as seen in the sight. However because only the attitude of the helicopter has changed, the command signal required to be transmitted to the missile to correct its course to the target remains unaltered, and the correct movement of the joystick 21 to produce this command signal remains O-A, although this movement no longer corresponds to the direction indicated by the tilted picture seen in the sight 12. Hence the operator is required to perform a mental operation to compensate for the roll of the helicopter in order to move the joystick 21 in the proper direction, and this may result in confusion and incorrect guidance of the missile. Moreover if the roll of the helicopter is accompanied by changes of attitude in pitch and/or yaw these will further disturb the alignment between the reference directions of the control system in the helicopter and the reference directions of the missile, and will result in increased inaccuracy of the control signals.

Figure 3:
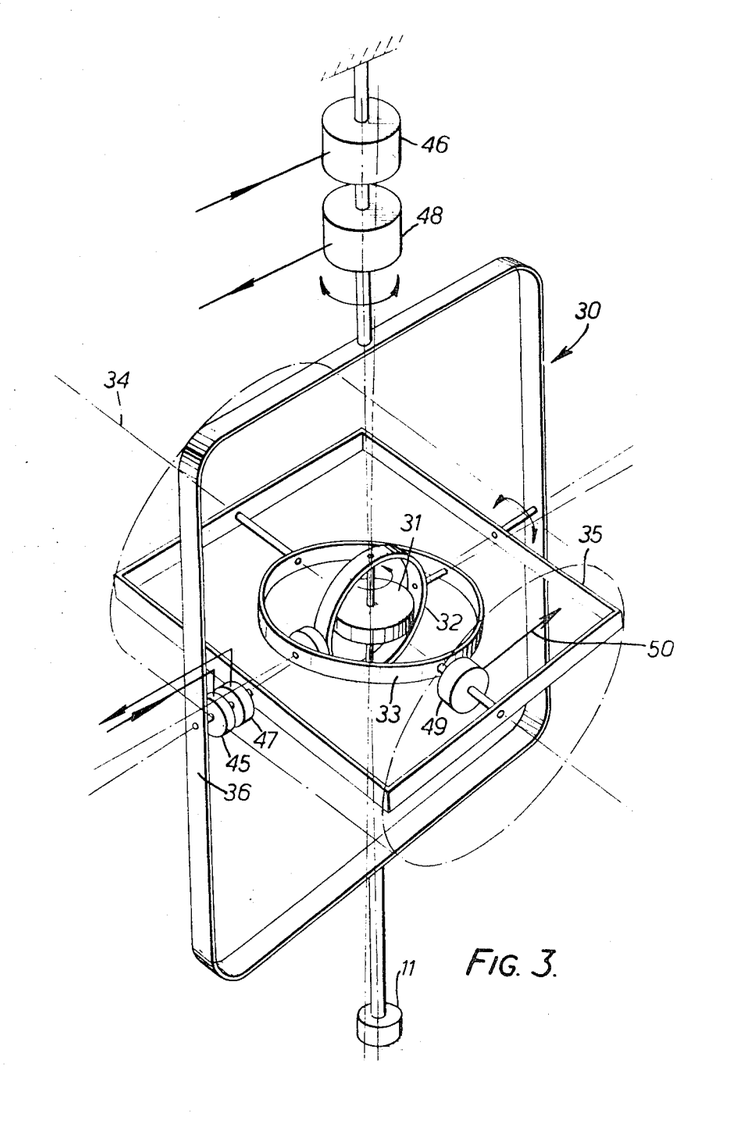
FIG. 3 is an enlarged diagrammatic view of the gimbal arrangements for the attitude compensating gyro device.

In order to overcome these difficulties, the portion of the control system which is mounted in the controlling helicopter includes an attitude compensating device 30 mounted in the helicopter 11 and driven from the mounting gimbals of the sight 12. The attitude compensating device 30 comprises a free gyroscope 31 mounted in inner and outer free gimbals 32, 33, the outer gimbal 33 being pivotally mounted about a pivotal axis 34 in inner and outer controlled gimbals 35 and 36. The outer controlled gimbal 36 is pivotally supported by a mounting 37 secured to the structure of the helicopter 11. The device 30 acts as an attitude reference system which is employed as an analogue of the directional reference system 25, 26, 27 in the missile 10. The controlled gimbals 35 and 36 are driven into transverse and vertical (X and Y) axes, will automatically ensure that the correct compensation signal is supplied to the roll angle resolver 51, since the gimbals 35 and 36 will drive the pivotal axis 34 of the gyro 31 into parallel relationship with the line of sight 16 of the sight so that for a given manoeuvre of the helicopter the angle of tilt sensed by the pick-off 49 for compensation purposes will always be equal to the angle of tilt of the picture seen in the sight 12 as a result of that manoeuvre.

As described, the simplest arrangement is that in which the pivotal axis 34 of the gyro assembly 31, 32, 33 is maintained exactly parallel with the line of sight 16. The roll axis of the gathered missile when in flight and under the manual control of the guidance system through the joystick 21 and control unit, will for minor displacements of the missile from the line of sight 16 be substantially parallel to the line of sight. For greater displacement of the missile from the line of sight, when the angle of divergence of the missile roll axis from the 'ine of sight 16 is great enough to be predictable, compensating predictions could be fed into the servo loops between the sight 12 and the attitude compensator device 30 in the form of additional analogue control signals supplied to the inputs of the servo amplifiers 43 and 44.

Figure 2:
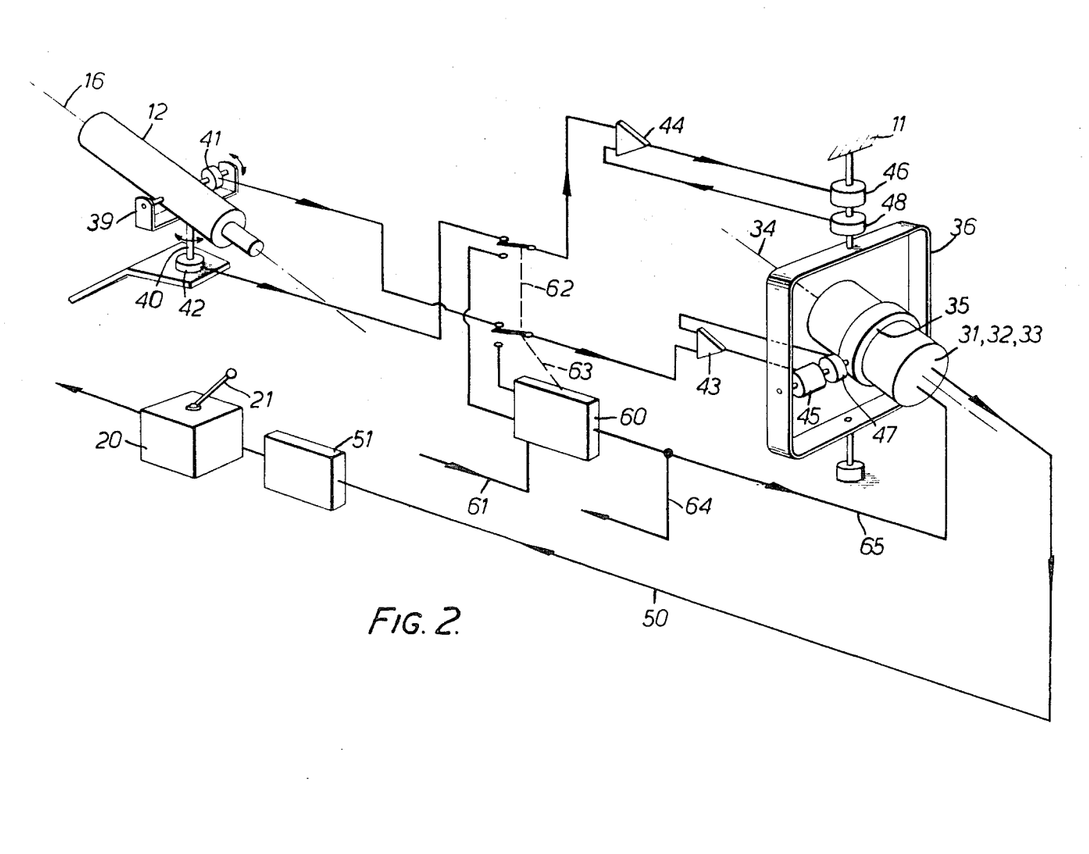
FIG. 2 is a circuit diagram of the portion of the control system which is mounted in the helicopter.
Figure 4:
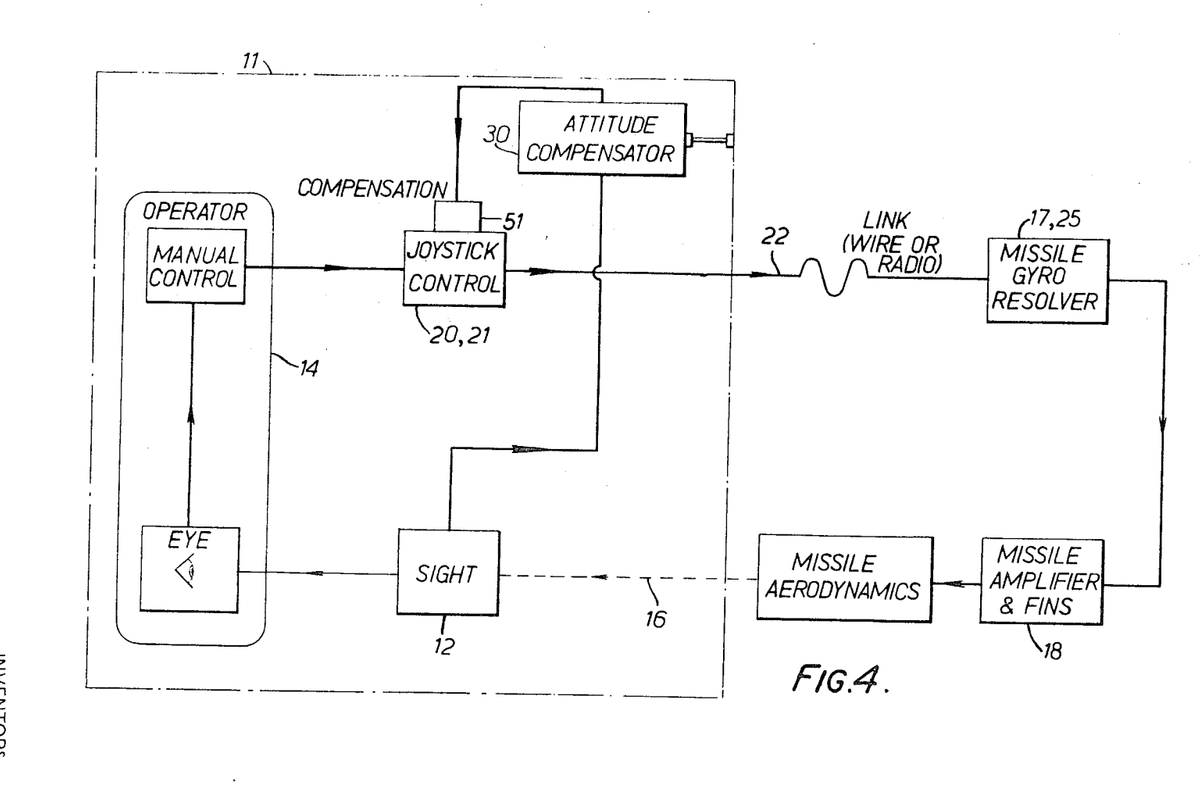
FIG. 4 is a servo diagram of the control system of FIGS. 1 to 3.

FIG. 4 is a servo diagram of the control system of FIGS. 1 to 3. As indicated therein, the feedback connection established through the sight 12, the attitude compensator device 30 and the roll resolver 51 introduces compensation into the signals transmitted from the joystick control 20, 21 through the trailing lead or radio command link to the missile gyro resolver 17, 25, to correct for misalignments between the directional reference systems of the missile and helicopter, which cannot be compensated by any direct mechanical feedback through the command link or the optical sighting.

Whilst the optical sight 12 has been described as being a simple telescopic sight, it will usually be preferable to employ a periscopic sighting system with a mirror system gyro-stabilised in elevation and azimuth, providing automatic compensation for the lateral displacement (usually vertical) of the operator's sight line from the optical line of sight from the periscope to the target. Such stabilised periscopic sights are well known, and normally incorporate electrical pick-off means to provide the required output signals proportional to angular displacement of the line of sight in elevation and azimuth, for feeding into the servo loops which control the gimbals 35 and 36 of the device 30.

Figure 5:
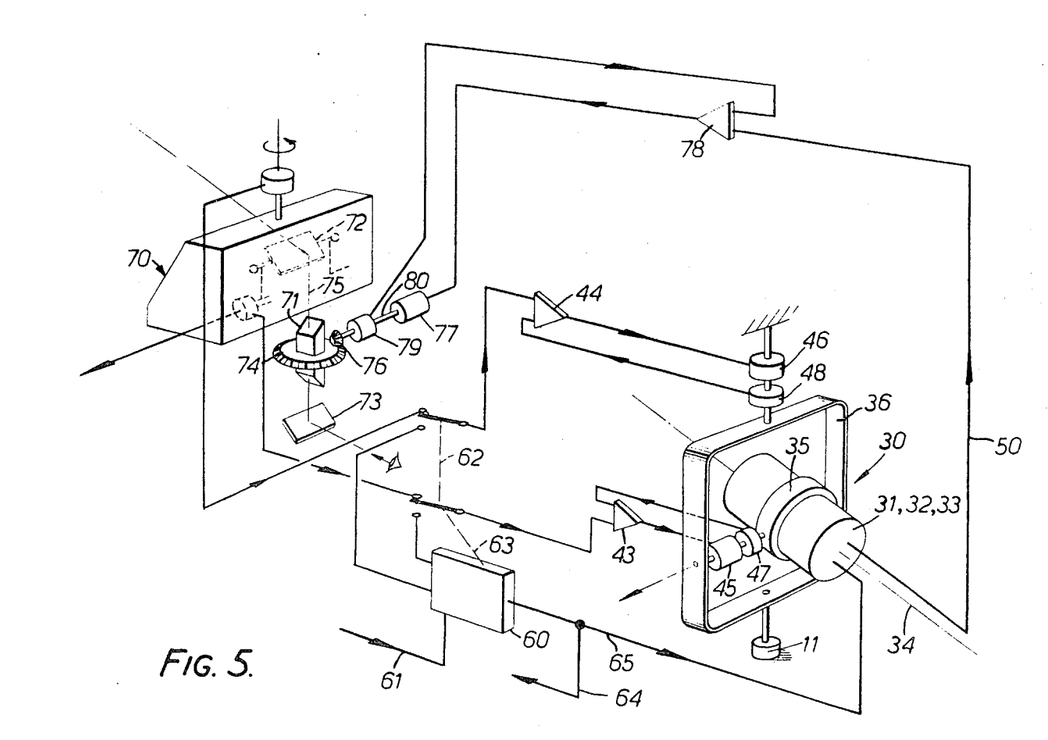
FIG. 5 is a circuit diagram similar to FIG. 2 of a modified control system, showing the parts which are mounted in the helicopter.
Figure 6:
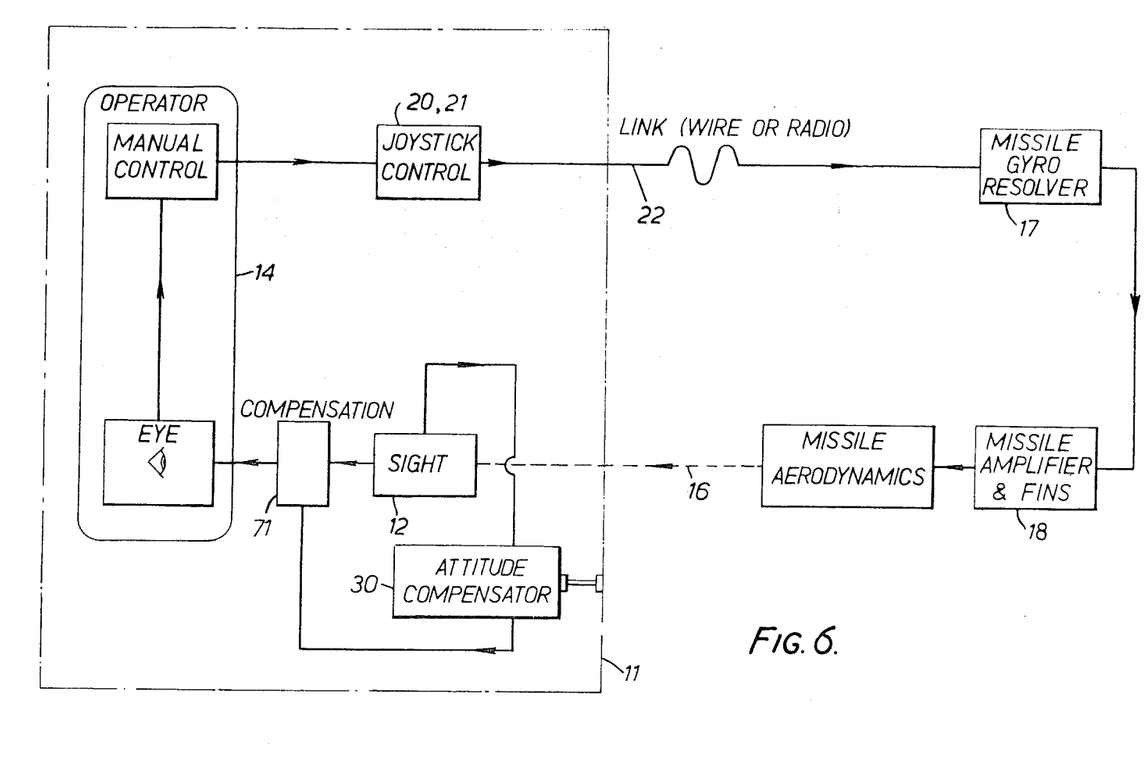
FIG. 6 is a servo diagram of the modified system of FIG. 5.

FIGS. 5 and 6 show a modified embodiment of the invention in which such a gyro-stabilised peroscopic sight 60 is employed in place of the sight 12 of FIG. 1. In this embodiment the required correction for misalignments of the attitude reference systems of the missile and helicopter is produced not by electrically rotating the joystick displacement pattern with respect to the corresponding outputs of the control unit 21 (which is omitted from FIG. 5 for clarity), but by optically rotating he actual picture as seen by the operator in the sight 60 to compensate for roll, so that whatever the aerodynamic manoeuvres of the helicopter the picture as seen by the operator in the sight 60 always remains level and untilted. This ensures that the appropriate correlation is preserved between the direction of the displacement of the missile image 10' from the target image 15' as viewed in the sight, and the direction of the corresonding movement of the joystick 21 required to correct the course of the missile, so that the operator merely has to move the joystick in the direction indicated by the picture viewed in the sight. The arrangement moreover has the advantage that because the picture as viewed in the sight 60 remains always horizontal and untilted, despite tilting of the helicopter, the direction in which the operator has to move the joystic to effect a given course correction remains constant and does not alter with roll. In other words, whereas as shown in FIGS. 1A and 1B it was necessary with the system of FIG. 1 for the operator to move the joystick from O to A to command a given missile course correction with the helicopter in level flight, but to move the joystick from O to B to command the same missile course correction when the helicopter had tilted and the picture in the sight was tilted; in the system of FIGS. 5 and 6 the movement of the joystick required to command a given course correction from 10' to 15' will always remain a movement from O to A regardless of tilted of the helicopter, the picture in the sight remaining horizontal as in FIG. 1A.

The optical rotation of the picture displayed by the periscope sight 60 is effected by means of a prism assembly 71 of the kind known as a Dove prism, mounted between the upper and lower mirrors or prisms 72 and 73 of the sight in a mounting 74 which is rotatable about the vertical optical axis 75 between the mirrors 72 and 73. The Dove prism 71 is rotated with its mounting 74 by means of bevel gearing 76 driven by an electric motor 77. The roll-compensation signal derived from the pick-off 49 of the attitude compensator gyro 31 is supplied to the input of a servo amplifier 78 the output of which energizes the motor 77 to effect the required rotation of the Dove prism 61. A pick-off device 79 coupled to the spindle 80 of the motor 77 provides positional feedback to the input of the amplifier 78.

FIG. 6 shows the servo diagram of the embodiment of FIG. 5. This is generally similar to that in FIG. 4, except that the compensation from the device 30 is applied at the optical sight rather than at the joystick controller.

Figure 7A:
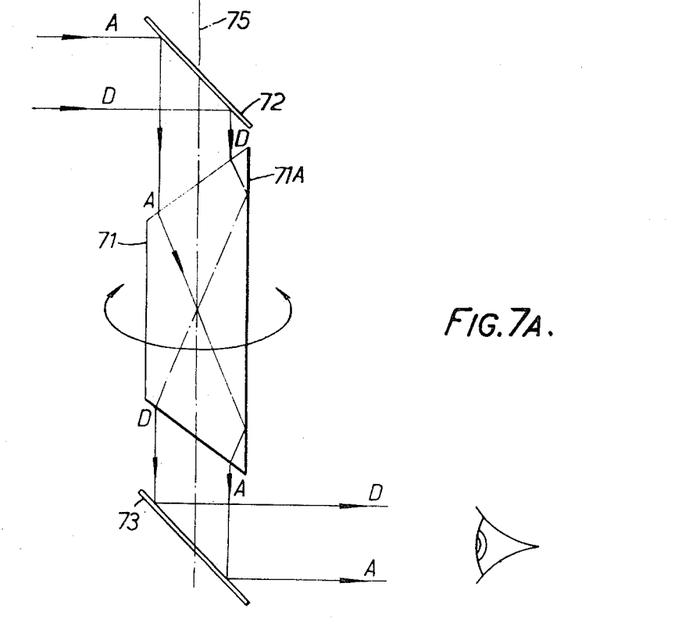
FIG. 7A is a diagram of the optical prism device provided for de-rotating the picture in the optical sight of the system of FIG. 5.
Figure 7B:
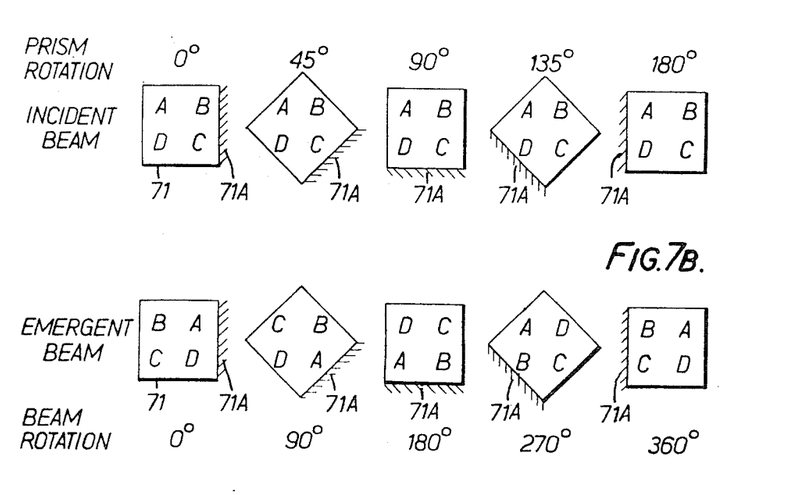
FIG. 7B is a diagram illustrating how the rotation of the optical prism through 180° rotates the light beam through 360°.

FIG. 7A is a diagram showing the Dove prism 61 in side elevation and showing the optical paths through the prism. Internal reflection of the light rays occurs at the flank 71A. FIG. 7B is a diagram showing how a light beam passing through the prism is rotated through 360° by the rotation of the prism through 180° about its optical axis 75. In the upper row in FIG. 7B is shown the incident light beam in cross-section defined by four parallel rays A B C and D in a square disposition, whilst in the lower row the beam A B C D is shown in the rotated crosssectional orientation in which it emerges from the prism, which is shown in cross-section in four successive rotary positions 45° apart.

Instead of the Dove prism 71, a so-called Pechan prism might be employed. This is a pair of prisms secured together with a part-silvered surface at their common face. The rotating effect of the Pechan prism on the light beam is similar to that of the Dove prism but involves a greater loss of light, incurred by the transmission of the beam through the part-silvered common surface.

Whilst in both the specific embodiments described above and illustrated the control system has employed an optical sight 12 or 60, this could be replaced by a positions in which they hold the pivotal axis 34 of the outer free gimbal 33 in an orientation which is approximately parallel to the roll axis of the missile in flight. The roll axis 34 may be directly parallel to the line of sight 16, or its direction may be a function of the direction of the line of sight together with other parameters (such as the rate of turn of line of sight) which can be separately determined. However for the purposes of clarity, the simplest case will now be described in which the pivotal axis 34 of the attitude compensation gyro is driven into parallel relation with the line of sight 16. For this purpose, the horizontal-axis and vertical-axis gimbal mountings 39 and 40 of the sight 12 in the helicopter 11 are provided with electrical pick-offs 41 and 42 the output signals of which are supplied via amplifiers 43 and 44 to electric motors 45 and 46 coupled respectively to the spindles of the inner and outer controlled gimbals 35 and 36, position feedback being provided by electrical position pick-offs 47 and 48 also on the spindles of the controlled gimbals 35 and 36. The output signal from the attitude compensator gyro 31 which represents rotation about the pivotal axis 34 is derived from a further pick-off 49 acting between the free outer gimbal 33 and the inner controlled gimbal 35, and is supplied through a line 50 to the input of a roll resolver unit 51 whose electrical output is fed into the control unit 20 associated with the joystick.

As shown in FIG. 2, the system is also provided with a caging control unit 60 mounted in the helicopter and arranged to be supplied with an input signal through a line 61 leading from the firing control for the missile. The caging control unit 60 is connectible via a two-pole, two-way switch 62 to the inputs of the servo amplifiers 43 and 44 in place of the sight pick-offs 41 and 42, the switch 62 being actuated through a link 63 by the caging control unit 60. The unit 60 also produces caging and uncaging signals which are transmitted via lines 64 and 65 respectively to the missile reference system gyro 25 and to the attitude compensator gyro 31, for the purpose of caging and uncaging these gyros.

The operation of the system will now be described, as follows. Prior to launch, the missile is mounted in a fore-and-aft position in the helicopter, with its reference gyro 25 caged. The switch 62 is in the caging position in which it has connected the servo amplifiers 43 and 44 to the caging control unit 60 to drive the controlled gimbals into positions in which the pivotal axis 34 of the free gimbal 33 of the attitude compensator gyro 31 is parallel to the fore-and-aft axis of the helicopter, and hence also to the roll axis of the missile mounted therein, and the gyro 31 is caged with its spin axis parallel to that of the caged reference gyro 25 in the missile.

When the helicopter 11 is in flight and the caged gyros 25 and 31 are spun up to speed in readiness for launching the missile, the firing signal is given, the caging control unit 60 transmits uncaging signals through the lines 64 and 65 to uncage the two gyros 25 and 31 simultaneously, and at the same time changes over the switch 62 to establish the servo loops between the optical sight 12 and the attitude compensator device 30. The output signals of the sight pick-offs 41 and 42 cause the motor 45 and 46 to turn the controlled gimbals 35 and 36 and drive the pivotal axis 34 of the outer free gimbal 33 of the gyro into the required alignment with the sighting axis 16, e.g., parallel in the simplest case. The missile is launched, and after launching is gathered by the automatic gathering control into an alignment in which it is visible in the sight 12, and subsequent control of the missile is effected manually by means of the joystick.

Thus the operator aligns the line of sight 16 with the target 15 and manipulates the joystick control to bring the missile image 10' towards the target image 15' viewed in the sight. If the helicopter 11 is level, this requires a movement of the joystick 21 from O to A in FIG. 1A. If however the helicopter has tilted so that the horizon line appears tilted as viewed in the sight, as in FIG. 1B, the operator moves the joystick in the direction parallel to the line 10'-15' as viewed in the sight, i.e., from O to B. The tilting of the helicopter will have been sensed by the gyro 31 in the attitude compensator device 30, and its pick-off 49 will have provided a compensating signal corresponding to the angle of deflection of the inner controlled gimbal 35 relative to the gyro-stabilized outer free gimbal 32 of the device 30. The output signal from the pick-off 49 is delivered to the roll angle resolver 51, whose electronic circuitry acting in response to the input signal produces a corresponding variation in the response of the control unit 20 to movements of the joystick to compensate for the tilting detected by the device 30. The action of the roll resolver unit 51 is to produce electrically a phase rotation between the displacements of the joystick 21 and the corresponding output signals of the control unit, the rotation corresponding to the tilt angle of the picture as viewed in the sight 12. Thus the correction of the output of the control unit 20 is such that the movement of the joystick control from O to B in FIG. 1B causes the control unit to transmit to the helicopter a course-correcting signal identical with that produced by movement of the joystick from O to A in FIG. 1A with the helicopter in level flight. Thus, whatever the angle of apparent tilt of the horizon as viewed by the operator in the sight, a movement of the joystick 21 in the direction parallel to the direction 10'-15' will always produce a course-correcting output signal from the control unit 21 compensated by the roll angle resolver 51 so as to be identical with that produced by a corresponding movement in level flight. The operator is thus always able to move the joystick control in the direction parallel to that indicated by the tilted picture seen in the sight, whatever the angle of tilt, and the system will automatically compensate for the misalignment of the directional references due to helicopter attitude changes and will ensure that corrected course-controlling signals are transmitted to the missile.

It will be apparent that when the sight is directed to a target immediately in front of the helicopter so that the line of sight 16 is parallel to the fore-and-aft axis of the helicopter, the angle of tilt of the picture viewed in the sight will equal the angle of roll of the helicopter. However, when the sight is swung around to follow a target off the line of the fore-and-aft axis, or the helicopter moves in pitch and/or yaw, roll of the helicopter will not produce an exactly equivalent angle of tilt of the picture viewed in the sight 12. For example in an extreme case in which the line of sight 16 is directed at right angles to the fore-and-aft axis, roll of the helicopter about the latter axis will produce zero tilting of the picture seen in the sight as it follows the target.

However, the action of the controlled gimbals 35 and 36, which are driven in accordance with the components of swivelling movement of the sight 12 about its television sighting arrangement in which a picture of the target and flying missile provided by a television camera is displayed on a screen to the operator in the helicopter. The operator follows the target image on the screen with a gimballed sighting device to provide the servo signals to drive the controlled gimbals 35 and 36, and guides the missile onto the target by the joystick control 20, 21. Again, instead of a television system, an automatic tracker might be used, of the kind employing a photoelectric screen which provides electrical output signals representative of the co-ordinates of the displacement from the electrical centre of the screen of an image of the missile (or of a flare carried by the missile) which is focussed on the screen. In each case the misalignment of the reference systems of the helicopter and missile due to manoeuvres of the helicopter would be compensated for by means as described, to ensure the transmission of corrected command signals to the missile. Moreover a fully automatic system may be envisaged, in which the human operator is replaced by an automatic electronic controller for the transmitter unit 20, the electrical signals from the television camera or automatic tracker being supplied to the controller together with tilt-compensating signals from the attitude compensating device 30.

The invention may be employed in other forms of moving craft than a helicopter, for example aircraft, ships and boats, and land vehicles.

What we claim as our invention and desire to secure by Letters Patent is:

1. A vehicle command system comprising:
   a movable controlling vehicle; a controlled vehicle referred to as a missile, and means for controlling the missile in flight after launching from the controlling vehicle including a transmitter transmitting command signals from the transmitter in the controlling vehicle to cause the missile to fly along a given line of sight from the controlling vehicle,
   the missile including, a flight control system responsive to the said command signals including an attitude reference system,
   an analogue reference system of the missile attitude reference system mounted in the controlling vehicle and maintained with the axes of its directional components in the same attitudes in space as the axes of the corresponding components of the missile attitude reference system both before and after the instant of launch of the missile and during its flight, and
   means for correcting the command signals transmitted from the transmitter by reference to the analogue reference system in the controlling vehicle so as to compensate for changes in the attitude of the controlling vehicle relative to the missile attitude reference system after the launch of the missile.

2. A command system as claimed in claim 1 in which the analogue reference system in the controlling vehicle comrpises a two-axis free gyroscope the rotor of which is mounted in inner and outer free gimbals, the outer free gimbal being pivotally supported in a further gimbal system comprising inner and outer controlled gimbals, and servo means being provided for maintaining the controlled gimbals in attitudes in which they support the free gyroscope with its outer gimbal pivotal axis in a predetermined directional relationship with, and approximately parallel to, the said given sight line.

3. A command signal as claimed in claim 2 including means for deriving a signal from the analogue reference system which represents the angular displacement of the inner controlled gimbal relatively to the outer free gimbal of the free gyroscope about the pivotal axis of the latter, and means for utilising the said signal for correcting the command signals to compensate for changes in attitude of the controlling vehicle.

4. A command system as claimed in claim 3 which includes an optical sighting system in the controlling vehicle, and a manually-operated joystick control for the command signal transmitter, and in which the sighting system includes means for generating output signals representing its angular displacement in elevation and azimuth relatively to attitude reference axes of the controlling vehicle, and in which the output signals from the sighting system are fed into the servo means so as to cause corresponding angular displacements of the controlled gimbals.

5. A command system as claimed in claim 4 in which the optical sighting system includes means for providing a visual image which shows the missile in flight and lateral displacement relative to the sight line, means for compensating the command signals for errors caused by the apparent tilting of the image as seen in the sight in response to a signal representing relative roll displacement of the inner controlled gimbal relative to the controlling vehicle due to roll of the controlling vehicle.

6. A command system as claimed in claim 5 in which in response to command movements of the joystick control from a centralized position in radial directions the transmitter transmits command signals, representing an analogue of corresponding radial vectors, for correcting the course of the missile in corresponding radial directions as seen in the optical sight, and electrical means responsive to the signal representing relative roll displacement of the inner controlled gimbal, is actuated thereby to cause the transmitter output to transmit signals representative of a relative rotation of the angular phase of the radial vectors, in relation to the phase of the corresponding radial command movements of the joystick control.

7. A command system as claimed in claim 4 in which the optical sighting system provides a visual image which shows the missile in flight and the lateral displacement of the flying missile from the sight line, and in which the signal representing relative angular displacement of the inner controlled gimbal is employed to rotate the image optically so as to compensate for tilting of the controlling vehicle and to maintain the image untilted relatively to the controlling vehicle as viewed by an operator therein.

8. A command system as claimed in claim 7 in which the signal representing relative angular displacement of the inner controlled gimbal energises a motor which rotates an optical prism assembly interposed in the light path of the sight to rotate the light beam emerging from the prism assembly about its longitudinal axis, the said light beam defining the image as viewed by the operator.

9. A command system mounted in a controlling vehicle for controlling a guided missile carrying an attitude reference system, the command system including in combination a transmitter device in the controlling vehicle for transmitting command signals to control the flight of the missile, a mechanical analogue reference system of the missile attitude reference system supported in inner and outer controlled gimbals in the controlling vehicle, an electrical pick-off and motor mounted in each of the pivotal axes of support of the inner and outer controlled gimbals, an optical sight in the controlling vehicle which is rotatable about its transverse axes of support in the vehicle, electrical pick-offs mounted in each of the axes of support of the sight for supplying position signals representative of the rotational movements of the sight, electrical servo devices with position feedback connecting the pick-offs associated with the axes of the sight to the pick-offs and motors of the inner and outer controlled gimbals to form servo loops by which the attitudes of the controlled gimbals are controlled in accordance with the attitude of the sight, means for actuating the analogue reference system and coupling the analogue reference system to the sight through the said servo loops simultaneously with the activation of the missile reference system in response to a firing signal used to launch the missile from the controlling vehicle, and an attitude compensating device for correcting the command signals to the missile in a manner determined by an output signal from the analogue reference system to compensate for tilting movement of the controlling vehicle after the launching of the missile.

* * * * *